D. B. FALK.
GARMENT BAG.
APPLICATION FILED OCT. 17, 1913.
1,101,421.
Patented June 23, 1914.
3 SHEETS—SHEET 1.
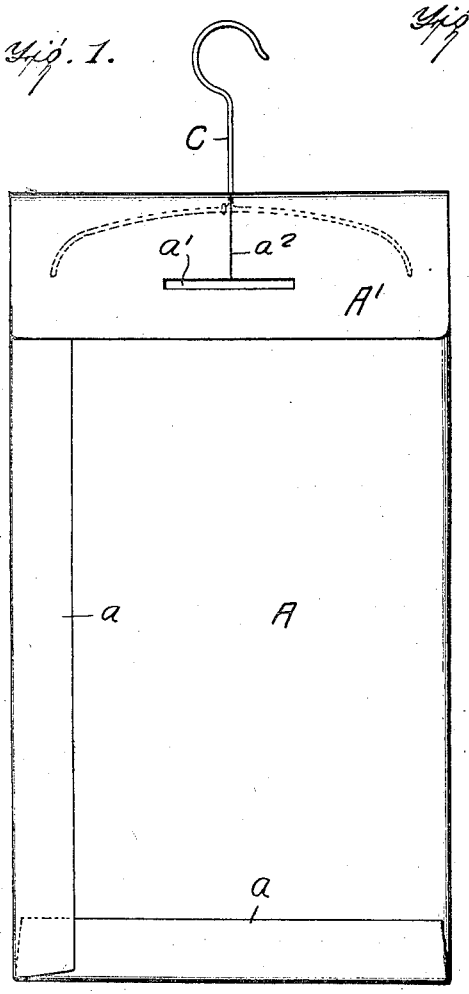
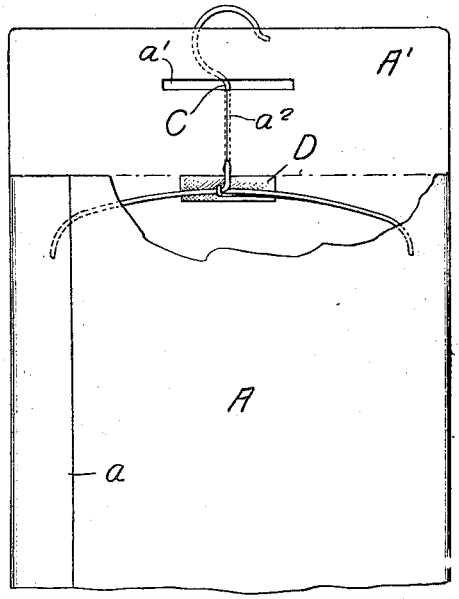
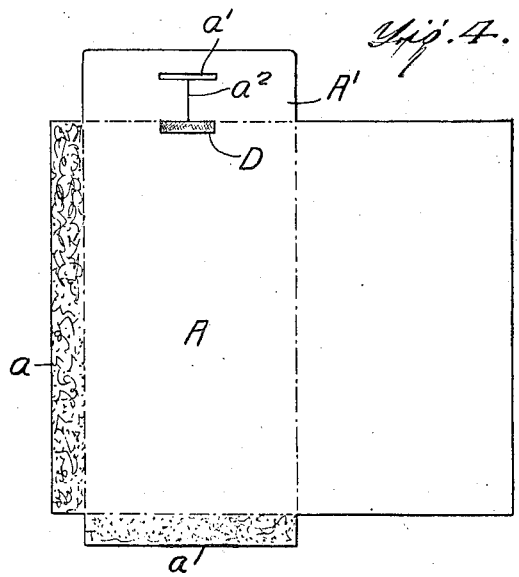
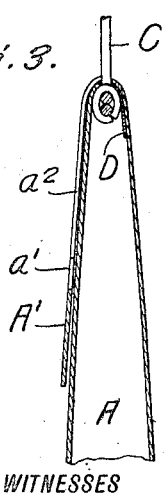
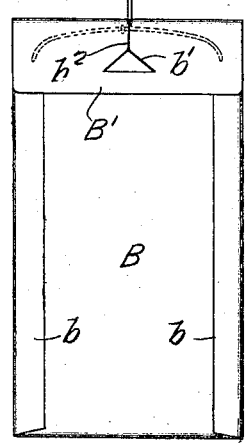
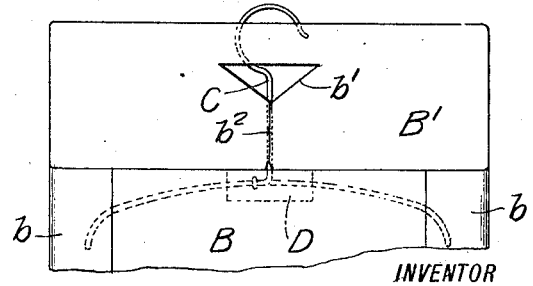
WITNESSES
INVENTOR
DAVID B. FALK,
BY Munn & Co.
ATTORNEYS D. B. FALK.
GARMENT BAG.
APPLICATION FILED OCT. 17, 1913.
1,101,421. Patented June 23, 1914.
3 SHEETS—SHEET 2.
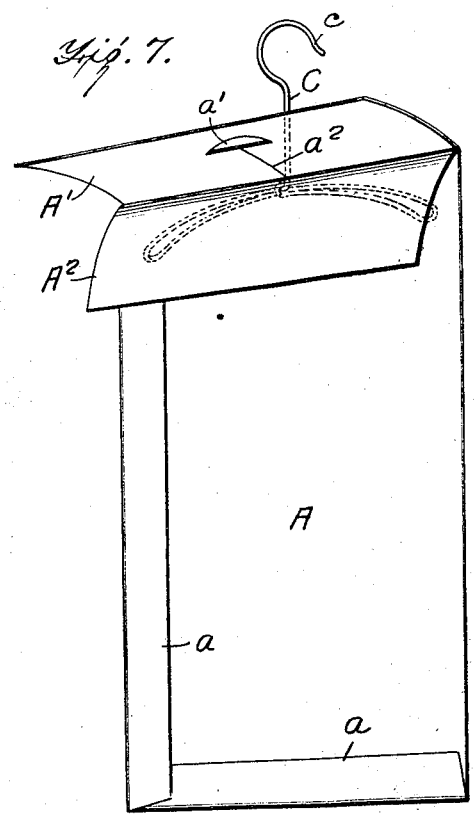
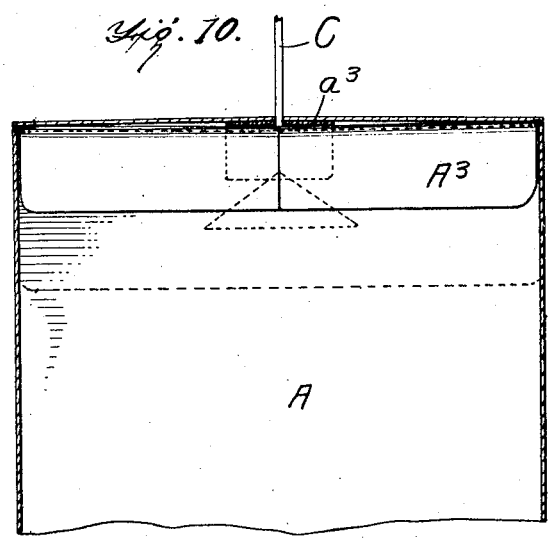
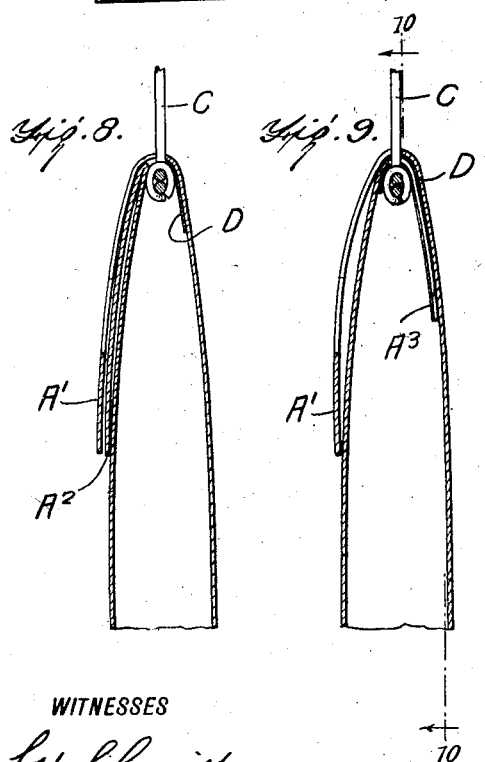
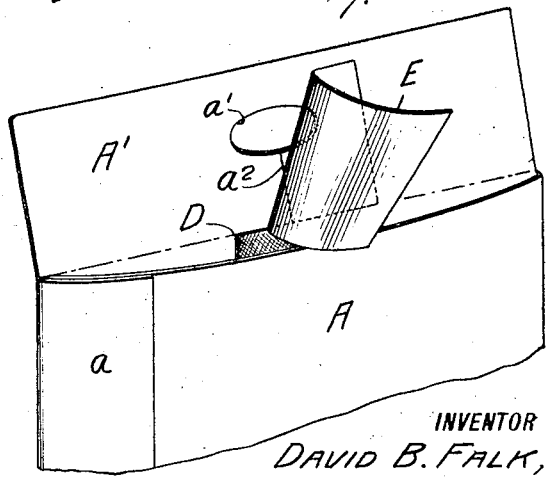
INVENTOR
DAVID B. FALK,
BY Munn & Co.
ATTORNEYS

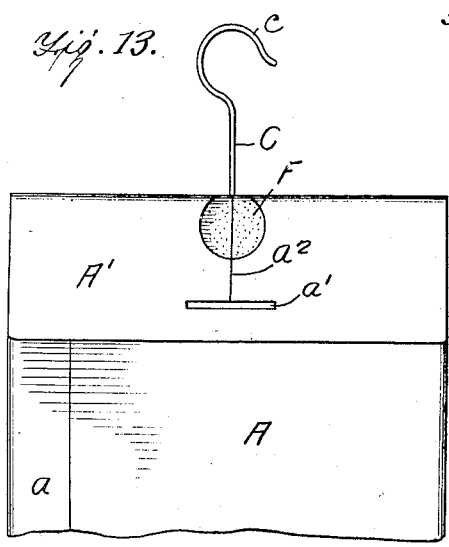
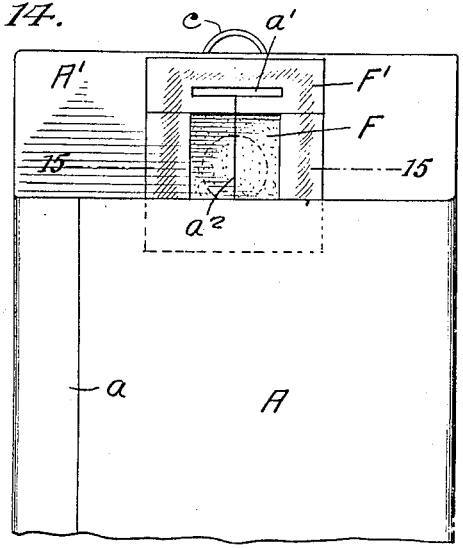
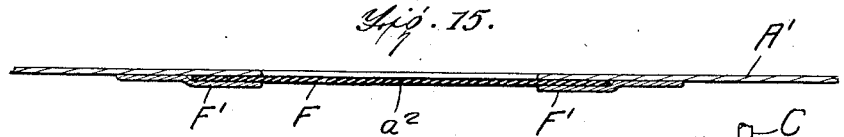
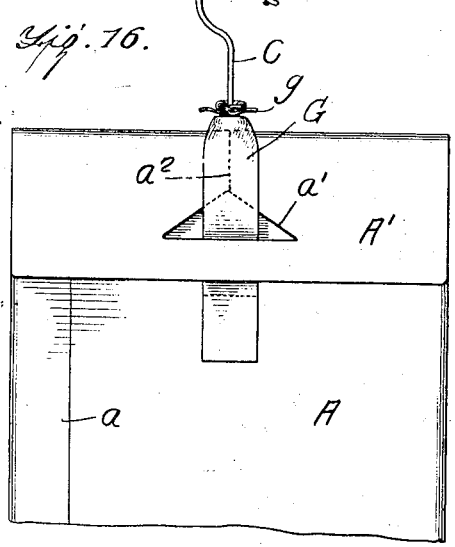
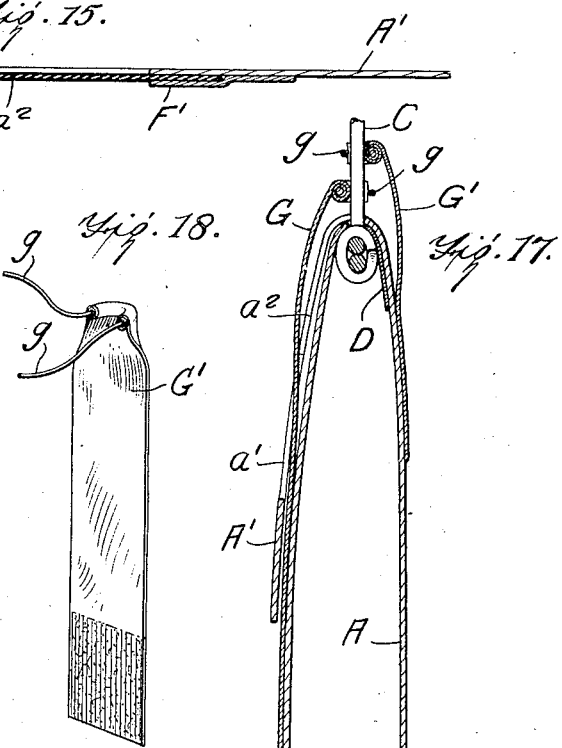
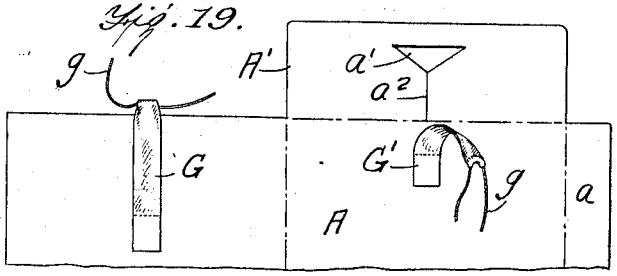

UNITED STATES PATENT OFFICE.

DAVID BEAUREGARD FALK, OF SAVANNAH, GEORGIA.

GARMENT-BAG.

1,101,421.   Specification of Letters Patent.   Patented June 23, 1914.

Application filed October 17, 1913. Serial No. 795,729.

*To all whom it may concern:*

Be it known that I, DAVID B. FALK, a citizen of the United States, and resident of Savannah, in the county of Chatham and State of Georgia, have invented an Improvement in Garment-Bags, of which the following is a specification.

My present invention is an improvement in garment bags or bags for holding garments particularly as described and claimed in my Patent Number 1070790, granted August 19, 1913, and consists in the provision of a top closing flap which is in one piece and provided with means for receiving the head and shank of a garment hanger therethrough in such manner that when the flap is closed with the garment and garment hanger in proper position, the garments will be protected from dust either temporarily or from season to season as may be desired.

In the accompanying drawings which show various means by which the above may be accomplished and which includes certain added arrangements for guarding against the entrance of dust within the bag, Figure 1, is an elevation illustrating one form in closed position. Fig. 2, is a similar view illustrating the closing flap in raised position and the body of the bag partly broken away to show an added feature insuring rigidity of the folding line between the flap and the body of the bag. Fig. 3, is a vertical section, on an enlarged scale, centrally through the upper portion of the bag shown in Fig. 2. Fig. 4, is a plan of the blank from which the bag illustrated in Fig. 2, is formed. Fig. 5, is an elevation illustrating a slightly modified form both as to the construction of the body of the bag and its flap, illustrating the bag in closed position. Fig. 6, is an elevation of the upper portion of the bag shown in Fig. 5, on an enlarged scale, and with the closing flap raised. Fig. 7, is a perspective view of another modified form wherein the body of the bag is provided with an additional flap. Fig. 8, is a vertical transverse section through the upper portion of the bag taken at a substantially central point through Fig. 7. Fig. 9, is a similar view through the upper portion of another modified form in which the body is provided with a supplemental dust excluding flap adapted to be turned inwardly. Fig. 10, is a vertical section through the form shown in Fig. 9 and taken substantially on the line 10—10 of said figure. Fig. 11, is a perspective view of the upper portion of that part of the body of the bag to which the additional flap is appended. Fig. 12, is a perspective view of the upper portion of the bag illustrating another modified form in which an additional piece is provided for the closing flap to be placed in position after the garment and the garment hanger are in position. Fig. 13, is an elevation of the upper portion of the bag illustrating another modified form in which the bag is provided with an inserted section of material capable of more snugly embracing the shank of the garment hanger. Fig. 14, is an elevation of the top portion of the bag shown in Fig. 13 with the closing flap raised. Fig. 15, is a detail transverse section taken substantially on line 15—15 of Fig. 14. Fig. 16, is an elevation of another modified form of the bag in which additional strips are provided for engagement with the shank of the garment hanger in order to further guard against the entrance of dust. Fig. 17 is a vertical transverse section taken centrally through the upper portion of the form of bag illustrated in Fig. 16. Fig. 18, is a perspective view of one of the shank engaging strips removed, and, Fig. 19, is a plan of the upper portion of the blank utilized to construct the form of my invention illustrated in Figs. 16 and 17 and showing the supplemental strips in connection therewith.

Referring now to these figures the body of my improved bag takes either one or the other of two forms throughout the several figures. The bag A as shown in Figs. 1 to 4 and 7 to 19 inclusive being formed with a back and front, the latter of which is an extension of one side of the back, the back being provided along its lower edge and its other side edge with flaps *a* and the upper main closing flap A′ being a continuation of the upper edge of the back of the body which is adapted to fold over the upper portions of the front of the body and the side flap *a*. The bag B as shown in Figs. 5 and 6 is formed of a back and front, the latter of which is a continuation of the lower edge of the back, the back having side continuations in the nature of flaps *b* and the upper closing flap B′ being a continuation of the upper edge of the back adapted to close the body in a manner similar to the section of the closing flap A before mentioned.

Each of the flaps A′ is provided with an opening $a'$ and a slit $a^2$ extending from the opening to the folding line between the body of the bag and the flap, this slit $a^2$ being located at a substantially central point between the side edges of the flap and the opening $a'$ being elongated in one direction, preferably in a direction laterally with respect to the body of the bag. Similarly the flap B′ is provided with an opening $b'$ and a slit $b^2$. These openings $a'$ and $b'$ may be of any suitable shape, either oblong as illustrated in Figs. 1 to 4 and 13 to 14; triangular as illustrated in Figs. 5, 6, 10, 16, and 19; semicircular as illustrated in Fig. 7 or oval as illustrated in Fig. 12, the particular shape being immaterial so long as its shape elongates the opening in one direction sufficiently to enable the same to receive the head $c$ of a garment hanger indicated in the several figures at C. I am thus enabled to quickly and easily introduce the head $c$ of the garment hanger through the opening of the flap after the garment is within the bag and subsequently pass the shank of the hanger through the slit which forms a passage to receive the same it being apparent that when the shank of the hanger has been moved through the slit to the folding line between the body of the bag and its closing flap to a point centrally between the side edges of the bag, that the material upon opposite sides of the slit will snugly embrace the shank of the hanger and, when the flap has been secured by any suitable means, the bag will be rendered practically dust proof, it being apparent that by the provision of a slit formed and located as described I am enabled to provide a bag for the purposes set forth having its closing flap in one piece and that the folding line of the flap effectively reinforces those portions immediately adjacent to the shank of the hanger in such manner as to assist in maintaining the same in close engagement with the hanger.

As shown in Figs. 2, 3, and 4, I may additionally reinforce the parts by a supplemental strip D of suitable material which strip is secured to the inner surface of the back of the bag body with its upper longitudinal edge co-incident with the folding line between the body of the bag and the closing flap so as to reinforce the parts without interfering with the movements thereof as above outlined.

It is apparent from the foregoing that when the flaps A′ and B′ are closed and held against the front of the bag body by any suitable means, ingress of dust is substantially prevented, although as an additional means of provision I may provide the upper end of the front of the bag body with an outwardly projecting supplemental flap $A^2$ as illustrated in Figs. 7 and 8, and which flap is in an unbroken single piece, against which the closing flap may be secured, and I may also provide the same part with an inwardly extended circular flap $A^3$ as seen in Figs. 9, 10, and 11, although in this case it will be necessary as shown to provide the inwardly projecting flap $A^3$ with a central slit in order to permit of the reception of the shank of the hanger. This slit of supplemental flap $A^3$ may be reinforced by a reinforcing strip $a^3$ of suitable material and proportions.

I may also provide a supplemental closing piece E, in lieu of either of the supplemental flaps $A^2$ and $A^3$, and either with or without the reinforcing piece D, this supplemental closing piece E being of suitable material and adapted to be secured in any suitable manner upon the inner surface of the closing flaps to cover both the openings and the slit $a^2$ and preferably with its inner longitudinal edge co-incident with the folding line between the body and its flap, all shown in Fig. 12, it being apparent that this supplemental piece is to be placed in proper position as stated after the garment is within the bag and the garment hanger passed through the opening and through the slit to its proper position.

As before stated the fact that the shank of the hanger C is positioned within the slit $a^2$ and located in the line of folding between the flap and the body of the bag, necessarily causes the material of the bag surrounding the shank of the hanger to snugly embrace the same, but in order to increase this effect I may utilize an insert F of a different material, for instance, rubber, as shown in Fig. 13, securing the same by supplemental pieces F′ upon the underside of the flap as shown in Figs. 14, and 15, the slit $a^2$ being extended through the insert. This constitutes by a slight deviation from the original manner described to render the bag substantially dust proof with a flap in one piece and still another modification along this line is illustrated in Figs. 16 to 19 inclusive in which supplemental strips G and G′ are respectively secured at their lower edges to the front and back of the bag body, the former being adapted to extend upwardly through the flap opening $a'$ after the garment and garment hanger are placed in position. The upper ends of these strips G and G′ are secured around the intermediate portion of connecting wires $g$, these wires being adapted to be bent around the shank of the garment hanger as shown particularly in Figs. 16 and 17 for the purpose of additionally guarding against the entrance of dust.

Various other forms might be shown as within the spirit of my invention and through the use of which a practically dust proof bag may be produced with a one-piece closing flap and wherein the opening provided for the introduction of the head of the garment hanger is at a point remote from the final position of the shank of the hanger, and I claim all such variations and modifications as fall within the spirit of the invention and within the terms of the following claims.

I claim:—

1. A garment bag having a top flap for closing its upper end, provided with an opening elongated in one direction to receive the head of a garment hanger, and also provided with a slit extending from the opening toward the folding line between the body of the bag and its top flap, said slit forming a passage for the shank of a garment hanger substantially as and for the purpose set forth.

2. A garment bag having its top closing flap provided with a slit one end of which extends toward the folding line between the body of the bag and the flap, and which forms a passage for the shank of a garment hanger, and also provided with an opening through which the head of a garment hanger may be inserted, located remote from the said folding line and with which the opposite end of the slit communicates.

3. A garment bag having its top closing flap provided with an opening and a slit leading from the opening toward the folding line between the body of the bag and the closing flap, said opening and slit respectively forming passages to receive the head and shank of a garment hanger, substantially as and for the purpose set forth.

4. A garment bag having its top closing flap provided with a laterally elongated opening and a slit leading from this opening to the folding line between the body of the bag and the said flap, the said opening and slit respectively forming passages to receive the head and shank of a garment hanger, substantially as and for the purpose set forth.

5. A garment bag having a closing flap provided with an opening to receive the head of a garment hanger and with a slit extending from the opening toward the folding line between the body of the bag and its flap and forming a passage for the shank of a garment hanger, and a supplemental piece whereby to prevent the entrance of dust within the bag through the opening and slit.

6. A garment bag having its closing flap provided with an opening to receive the head of a garment hanger and with a slit leading from the opening toward the folding line between the body of the bag and its flap and forming a passage for the shank of a garment hanger, and a supplemental piece secured upon the inner surface of the flap to cover the opening and the exposed portion of the slit after the garment hanger is in position.

DAVID BEAUREGARD FALK.

Witnesses:
W. H. ALL,
A. A. SOLOMONS.